United States Patent [19]

Tenniswood et al.

[11] 3,757,135
[45] Sept. 4, 1973

[54] ADJUSTABLE CONTROL SWITCHING MECHANISM

[75] Inventors: David M. Tenniswood, Troy; John E. Arnold, Auburn Heights; Robert E. Kaptur, Birmingham; Toncho G. Tonchev, Detroit; Herbert J. Franke, Troy, all of Mich.

[73] Assignee: Gemco Electric Company, Clawson, Mich.

[22] Filed: Jan. 6, 1972

[21] Appl. No.: 215,826

[52] U.S. Cl. .................................. 307/139, 200/47
[51] Int. Cl. ............................................. H01h 3/16
[58] Field of Search .................. 307/139; 200/47, 200/33 C, 38 E

[56] References Cited
UNITED STATES PATENTS

| | | |
|---|---|---|
| 2,556,095 | 6/1951 | Loewenstein ................... 200/38 E |
| 3,192,350 | 6/1965 | Horberg ............................ 200/47 X |
| 2,650,275 | 8/1953 | Doutt ................................ 200/47 X |
| 3,586,805 | 6/1971 | Ziegler ............................. 200/38 E |

Primary Examiner—Robert K. Schaefer
Assistant Examiner—M. Ginsburg
Attorney—Burton & Parker

[57] ABSTRACT

An adjustable control switching mechanism for machines having a repetitive cycle of operation, comprising a support fixed with respect to the machine, a part mounted for movement on the support and coupled to a shifting machine element to be moved correspondingly to such element, and a plurality of switch modules each having a micro-switch selectively shiftable therealong for actuation by the movable part as it is moved in response to the operation of the machine, with each microswitch connected to a machine function to actuate the machine in a predetermined cycle of operation.

15 Claims, 12 Drawing Figures

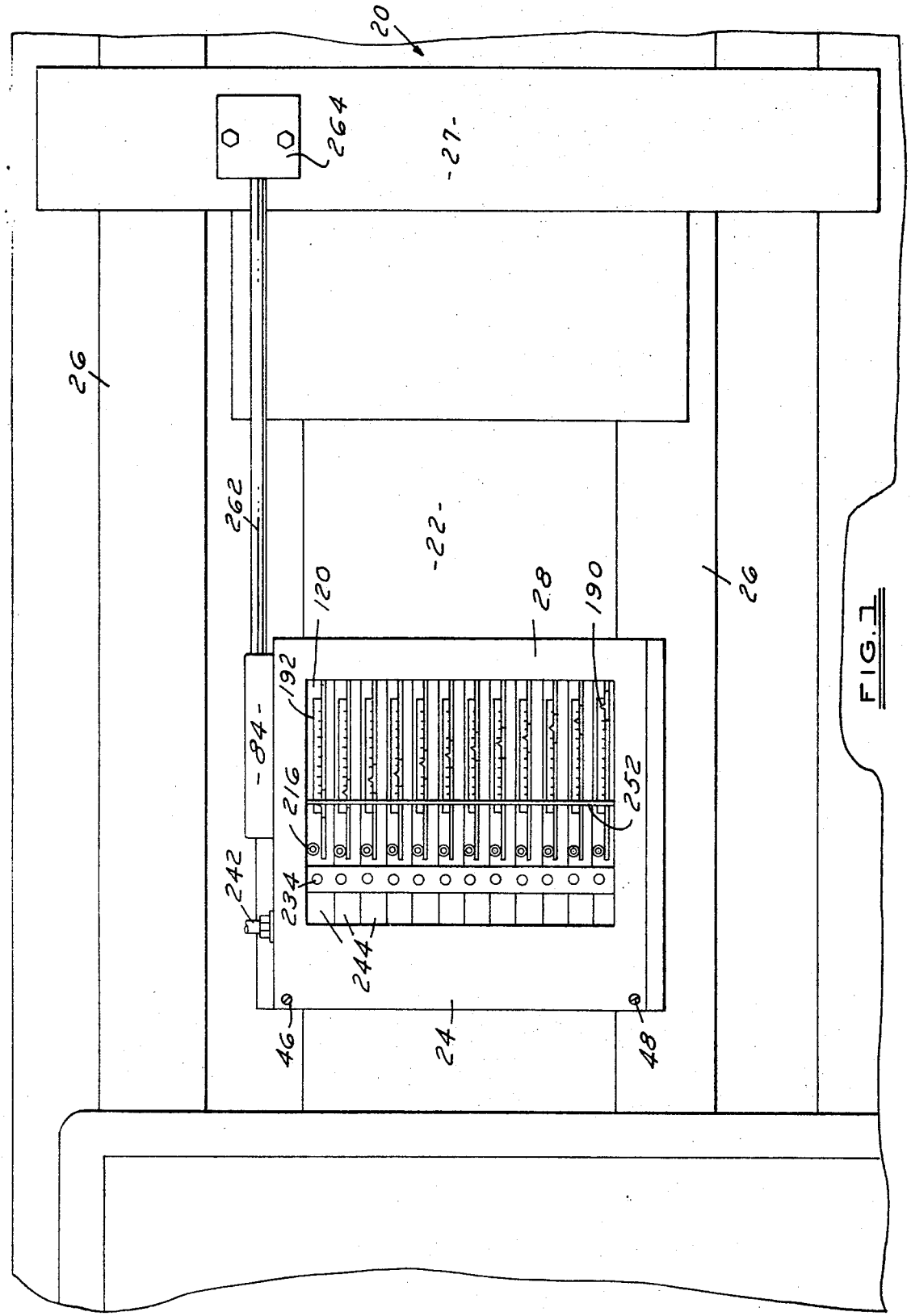

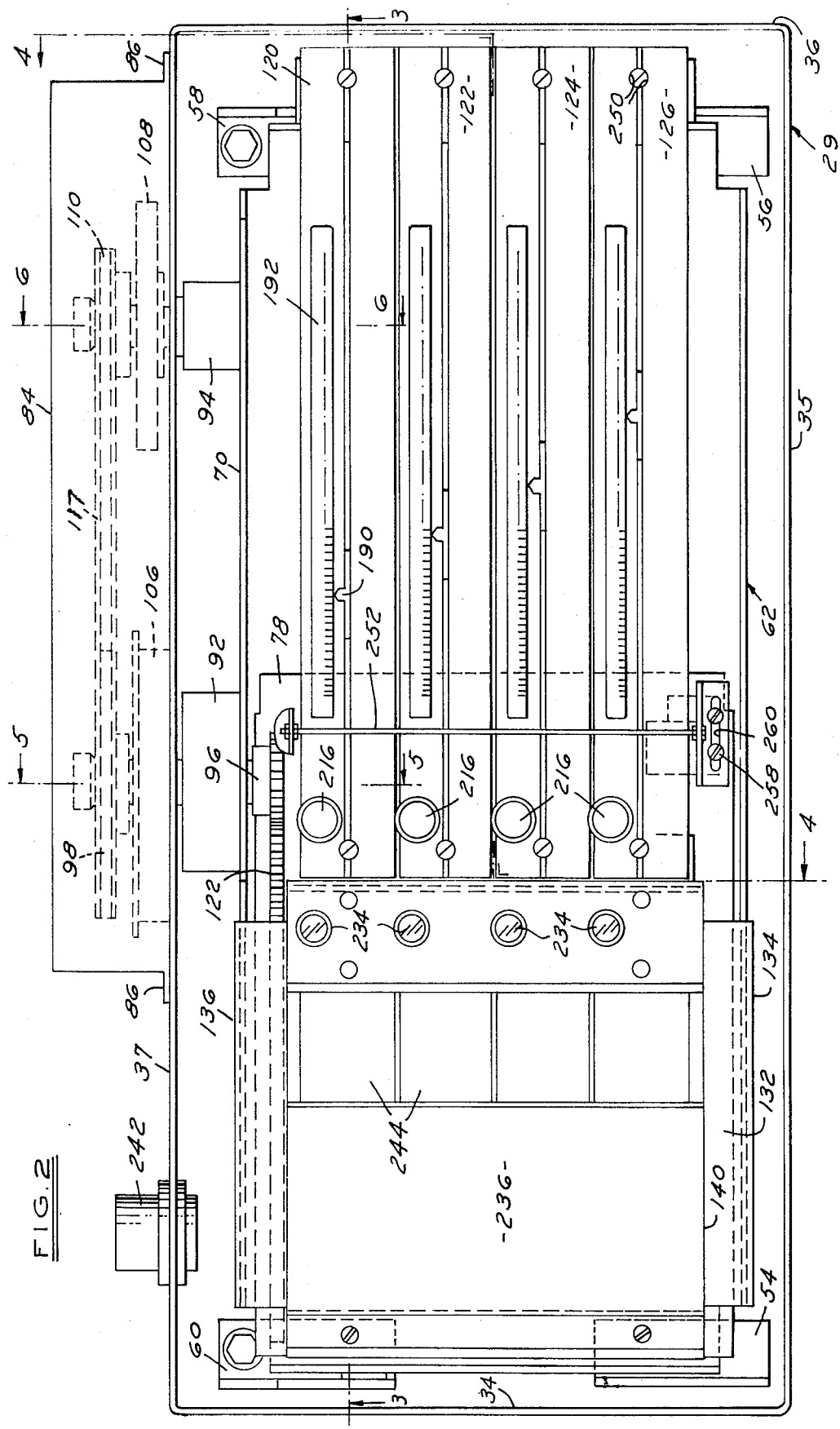

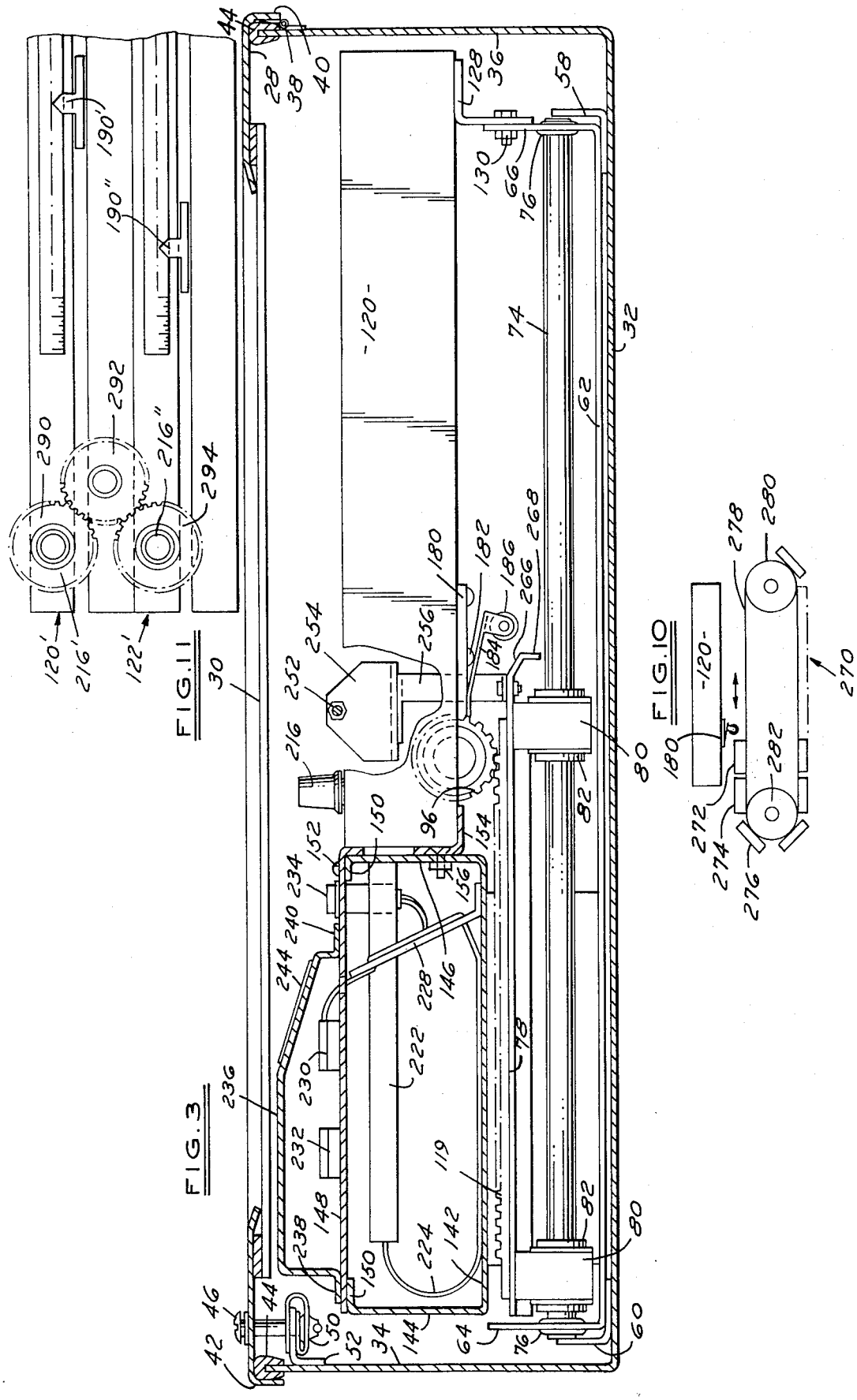

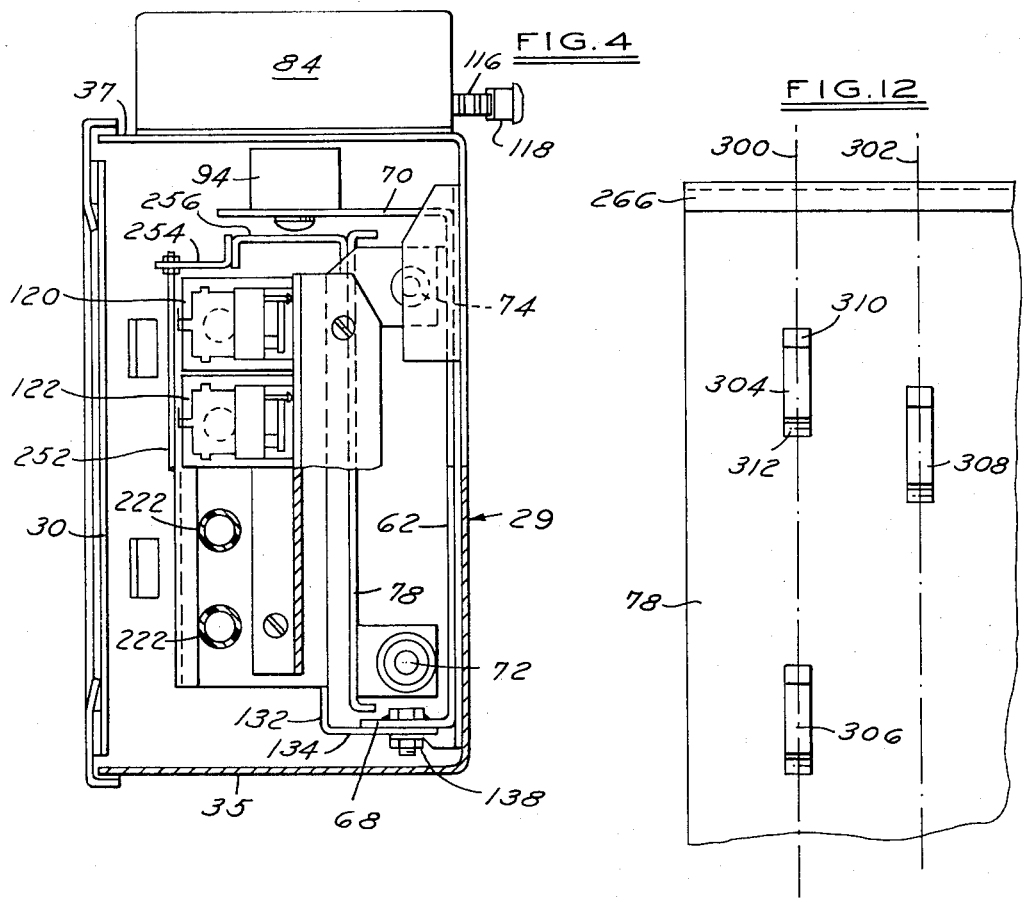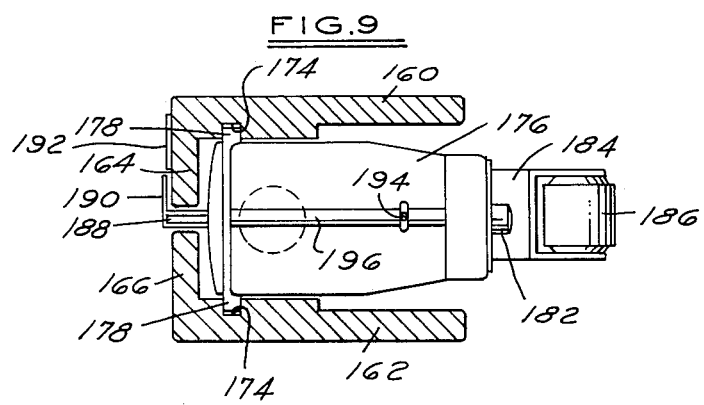

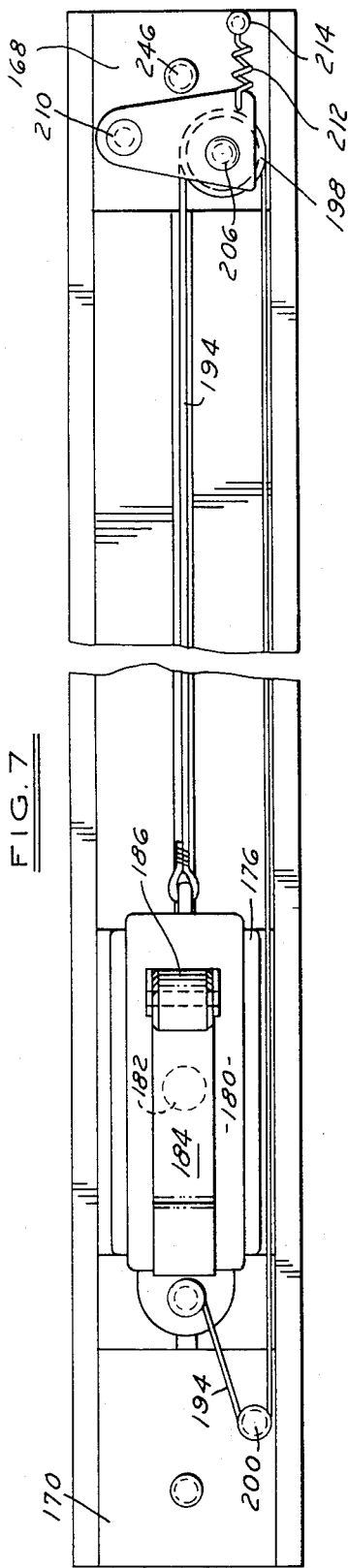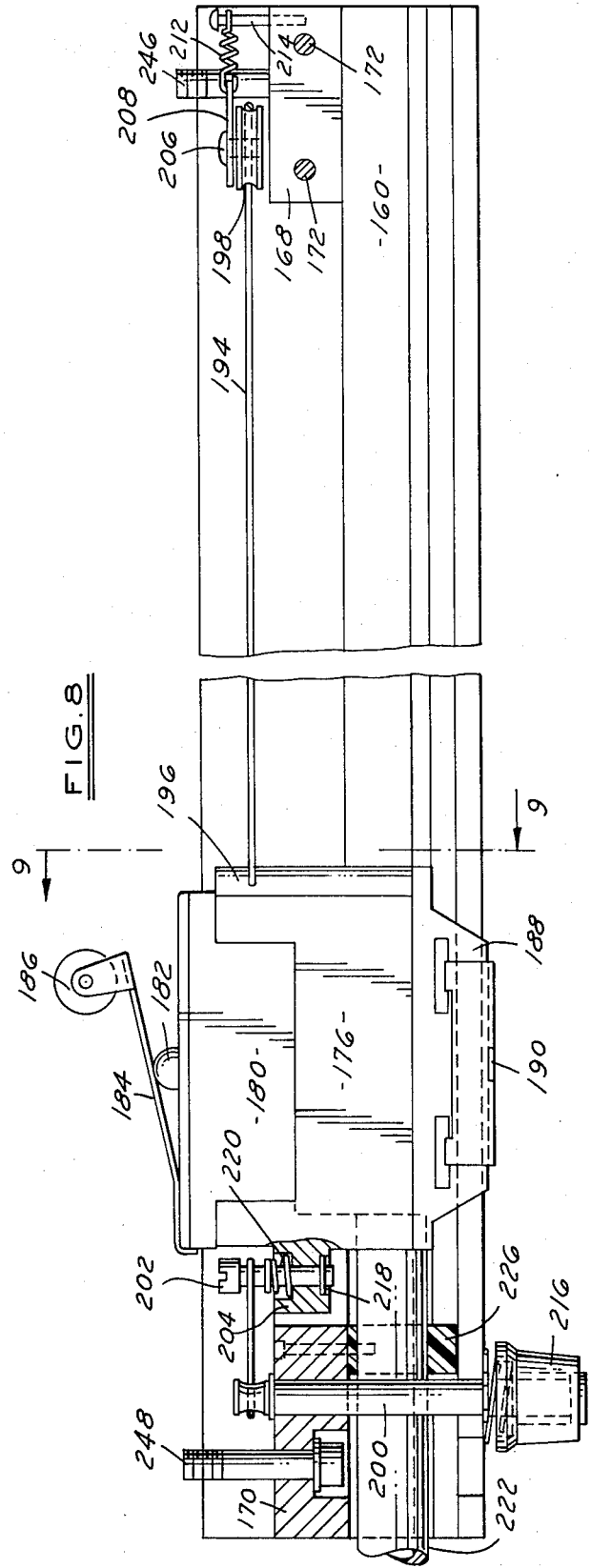

ADJUSTABLE CONTROL SWITCHING MECHANISM

BACKGROUND OF THE INVENTION

1. Field of the Invention

The invention pertains generally to the field of machine control, and more particularly to mechanism for controlling the operations of a machine having a repetitive operating cycle wherein a machine element shifts in a predetermined path during each cycle, the control mechanism being operably coupled to the element for linear correlated movement therewith to thereby sequentially actuate a plurality of switch means which are connected to the machine to initiate the machine functions in timed sequence.

2. Description of the Prior Art

In the art of machine control, it has long been the practice to provide a plurality of limit switches strategically positioned for actuation by a movable part on the machine to thereby initiate and/or interrupt various machine functions. For example, in machines such as injection molding machines, initiation of the various machine functions is controlled by limit switches having projecting rollers, the switches being adjustably mounted on bars. One or more switch actuating rods are mounted on the machine for movement with the machine element, the rods positioned adjacent the switches so that as the rods are shifted in response to machine operation, the switch rollers are contacted, thereby opening or closing the switch contacts.

Very often it is necessary to vary the timing of the machine functions, and to this end, the limit switches above mentioned are usually clamped to their supporting bars, the clamps being manually releasable to permit adjustment of the switches along the bars. Using the injection molding machine again as an example, when different parts are to be molded on the same machine, it is frequently necessary to change the timing of various functions to properly mold each part. In order to accomplish this, the limit switch clamps are loosened, and the switches are repositioned along the bars.

As the machine timing must be quite accurate, it is frequently necessary for the operator to adjust the limit switches approximately, then cycle the machine to visually observe the timing sequence, and then repeat the procedure until the machine is operating in exactly the proper sequence for the particular mold being used. This requires an experienced operator intimately familiar with the machine and the molds, and even with trained personnel, the change-over is laborious because of the trial and error method that must be employed. In many cases it take the operator up to ninety minutes or more to readjust the controls. This is unproductive "down time" for the machine, and obviously is undesirable.

Even apart from the length of time required to reset the machine controls, there is an ever-present danger to the operator if he attempts to adjust the limit switches while the machine is in motion, which is nearly always the case. In a molding machine, the clamp speeds may be upwards of 100 feet per minute, with the switch-actuating rod or probe moving at the same speed. If the operator gets his hand, arm or a part of his clothing caught between the moving probe and a switch or switch bar, a serious injury could well result, and many such injuries have in fact occured.

The instant invention overcomes these deficiencies of the prior art by providing a compact control switching mechanism which can be conveniently mounted on existing machines and incorporated in the design of new machines, which mechanism is accessible for quick adjustment of the switches for controlling machine function without danger to the machine operator. Maximum versatility is assured by the provision of a mechanism having virtually any desired number of individually adjustable switch means in a single unit, depending upon the requirements of the particular machine to be controlled. The same basic mechanism may be utilized to control different machines having a wide variety of operating characteristics. The basic adjustable switch module is constructed so as to be adaptable to virtually all known machines requiring this type of control, and the mechanism may be adapted to any particular machine by merely providing different control-to-machine drive means adapted to the particular machine.

SUMMARY OF THE INVENTION

The invention is directed to mechanism for controlling a machine having a repetitive cycle of operation, including a part coupled to a movable machine element for movement in a linear path correlated to the movement of the machine element, a plurality of switch means supported adjacent the moving part for actuation thereby during movement of the part, each switch means being adjustably positionable along said linear path to permit selective variation of switch actuation with respect to the cycle of machine operation. Also contemplated by the invention is a switch module having an elongate support upon which is guidably mounted a switch carriage, with switch means on the carriage, and means for selectively positioning the carriage and switch at any desired position along the support.

Each of the switch means is mounted in what may be termed a switch module, providing an integral unit, any number of which may be mounted in the control mechanism to give the necessary control functions for any given machine. Each switch module is constructed to be mounted in and removed from the assembly without disturbing any other parts of the mechanism, providing quick and easy replacement in case of malfunction. The aforementioned switch actuating part is coupled to the movable machine element through a chain drive and gears, thus enabling variation of the travel of the part with respect to a given machine stroke by merely changing the ratios of the drive parts. As an illustration, assume a control mechanism having an effective travel of 10 inches utilized to control an injection molding machine having an identical 10-inch stroke. The same control mechanism may be used to control a machine having a 40-inch stroke merely by changing the connecting reduction gearing from a 1-to-1 ratio to one having a 4-to-1 ratio, whereby the control mechanism part now moves only 1 inch for each 4 inches of machine stroke. Utilizing the construction shown herein, the basic structure of the control mechanism may be standard and interchangeable, and can be adapted to virtually any machine merely by providing different control-to-machine connections.

BRIEF DESCRIPTION OF THE DRAWINGS

FIG. 1 is a partial side elevation of a machine having a reciprocable machine element showing an adjustable control switching mechanism embodying the invention mounted thereon;

FIG. 2 is an enlarged front elevation of an adjustable control switching mechanism similar to that shown in FIG. 1, with the front cover removed to show details of construction;

FIG. 3 is a section taken along line 3—3 of FIG. 2 showing details of construction;

FIG. 4 is a section taken along line 4—4 of FIG. 2;

FIG. 7 is a bottom elevation of one of the switch modules;

FIG. 8 is a side elevation, partly in section, of one of the switch modules;

FIG. 9 is a cross-section taken along line 9—9 of FIG. 8;

FIG. 10 is a schematic diagram of a modified switch actuating part;

FIG. 11 is a partial top elevation of two switch modules showing means for adjusting adjacent switches in unison; and FIG. 12 is a partial top elevation of the switch actuating table showing means for momentarily actuating the switches.

DESCRIPTION OF THE PREFERRED EMBODIMENTS

Figure 5:
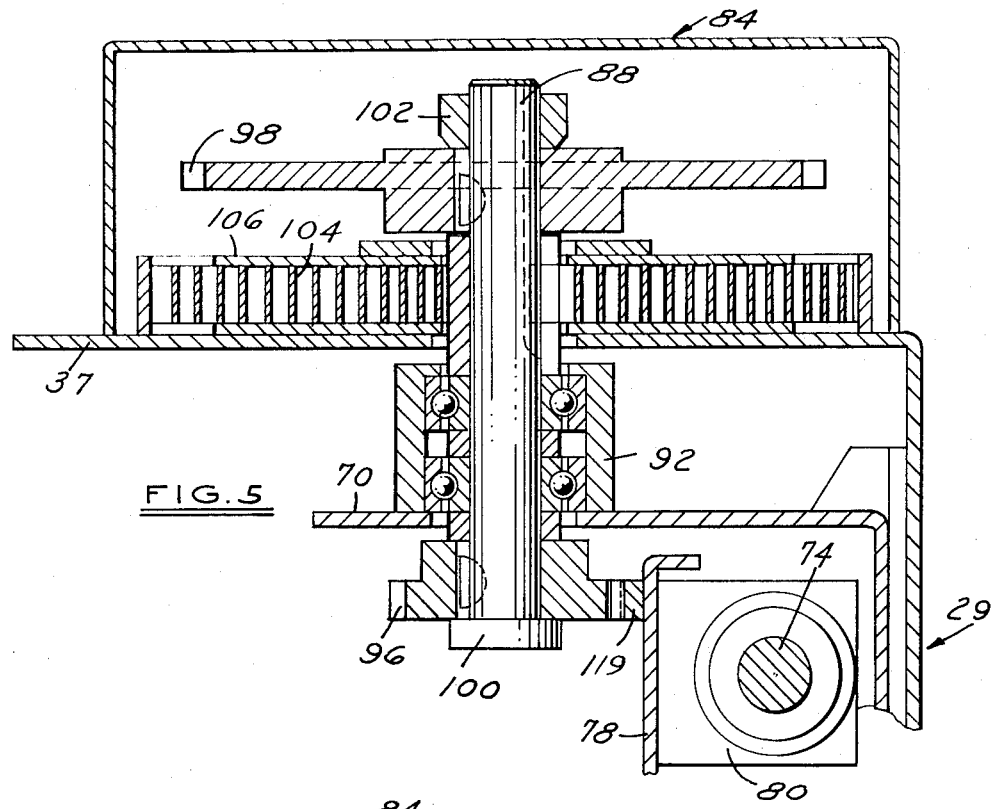
FIGS. 5 and 6 are partial cross-sections taken along lines 5—5 and 6—6 respectively of FIG. 2 showing the structure for coupling the switching mechanism to a moving machine element.

Referring now more particularly to the drawings, there is shown somewhat schematically in FIG. 1 a portion of a machine indicated generally by the numeral 20 having a structural member 22 to which the adjustable control switching mechanism 24 embodying the invention is secured. The machine 20 has a pair of tie rods or the like 26 upon which a platen 27 reciprocates. For convenience of description, the machine 20 will be referred to herein as an injection molding machine. However, it is to be understood that the mechanism illustrated and described which embodies the invention is not restricted to use with such a machine, and is in fact suited for use in controlling the operation of virtually any machine having an element which moves in a repetitive cycle with each cycle of machine operation. Examples of machines the control of which can be accomplished are: die-casting machines, transfer machines, grinding machines, and the previously mentioned injection molding machines. It is also to be noted that while linear reciprocating movement of a machine element will be referred to throughout the description, machines having various other types of machine element movement may be conveniently controlled by a mechanism of the character hereinafter described.

The mechanism 24 embodying the invention may conveniently be enclosed in a rectangular, box-like cabinet 29 including a front panel 28 having a transparent portion 30 so that the controls can be visually observed without opening the cabinet. As shown in FIG. 3, the cabinet is constructed of sheet metal, and includes a bottom wall 32 and integral side walls 34, 35, 36 and 37. The front panel 28 is hinged as at 38 to the side wall 36 along one side, and has side flanges 40 and 42 which overlie the marginal edges of the side walls, the latter being provided with a U-shaped strip 44 of rubber or the like engaged on their marginal edges against which the panel 28 abuts when closed to keep out dirt and dust. Any convenient holding means may be utilized on the side of the panel opposite the hinge 38, there being shown a pair of machine screws 46 and 48 extending through the panel 28 threadably engageable with sheet metal nuts 50 (FIG. 3) mounted on bracket 52 welded to the side wall 34. Release of the screws 46 and 48 from their engagement with nuts 50 permits the panel 28 to be swung open on hinge 38.

Secured to bottom 32 adjacent the corners thereof are four L-shaped mounting feet 54, 56, 58 and 60 upon which is mounted a pan-like chassis 62 having upturned end flanges 64 and 66 (FIG. 3) and side flanges 68 and 70 (FIG. 4). The chassis 62 serves as a base for the parts to be described. Extending between and supported in opposite chassis end flanges 64 and 66 are a pair of shafts 72 and 74 (FIGS. 3 and 4) which are mounted in grommets 76 or the like and are held against axial displacement by the legs of the four mounting feet 54, 56, 58 and 60. Atop the shafts 72 and 74 is positioned a cam plate or table 78 having secured to its underside four bearing assemblies, two of which are shown on shaft 74 in FIG. 3, the other two similarly positioned on shaft 72. Each bearing assembly includes a bearing block 80 fixed as by welding to the underside of cam plate 78, and a ball bushing 82. The cam plate 78 is thus supported for rectilinear movement back and forth along the shafts 72 and 74.

Figure 6:
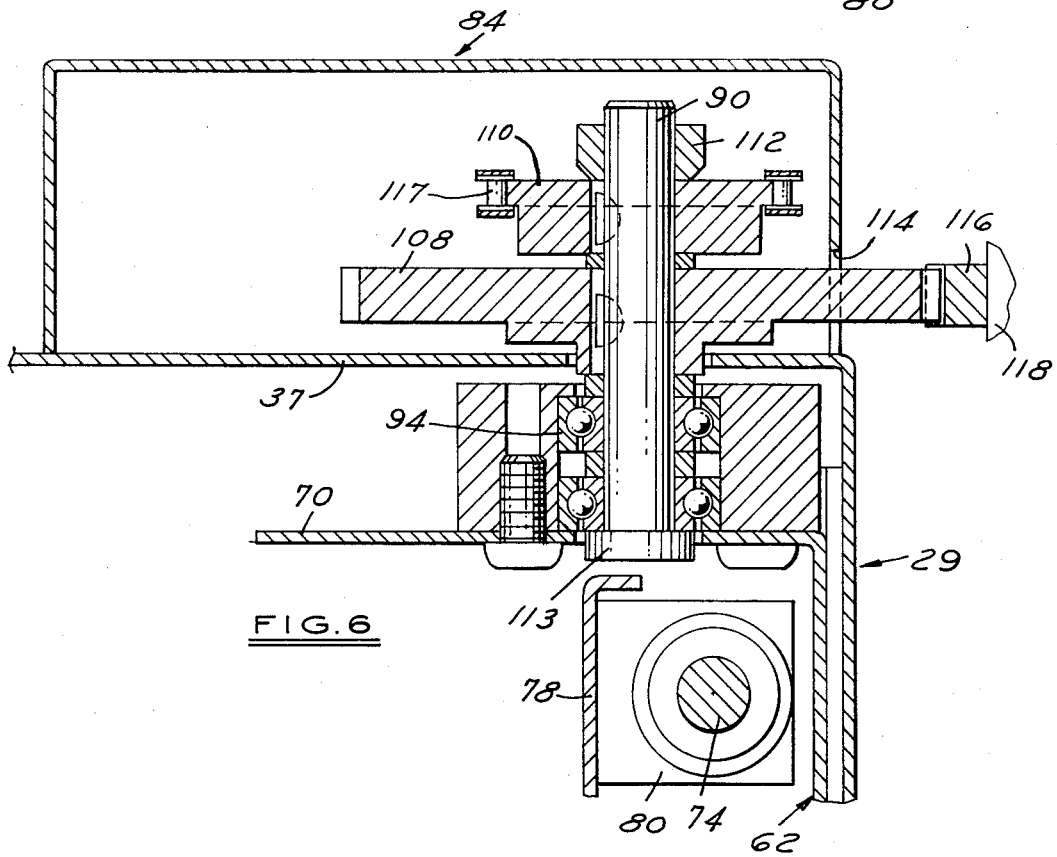

Mounted on top of the cabinet 29 is a smaller enclosed housing 84 having top and side walls, the latter terminating in flanges 86 (FIG. 2) through which screws, bolts or the like (not shown) may extend to secure the housing 84 to the cabinet 29 (FIG. 2). The top wall of cabinet 29 is apertured to accommodate a pair of shafts 88 and 90 in which are supported for rotation in bearings 92 and 94 mounted on upstanding flange 70 of chassis 62 (FIGS. 2, 5 and 6). Referring to FIG. 5, shaft 88 extends through bearing 92 and has an external gear 96 keyed to its inner end and a sprocket 98 keyed to its outer end. The gear and sprocket are retained on the shaft by an enlarged shaft end portion 100 and a nut 102 at its opposite ends. A helical spring 104 encircles shaft 88 with its inner end fixed to the shaft and its outer end fixed to a stationary part of the assembly, such as a spring cover member 106. The function of the spring 104 will become apparent as the specification proceeds.

The remaining shaft 90 (FIG. 6) has both an external gear 108 and a sprocket 110 keyed to it, which gear and sprocket are held thereon by a retaining nut 112, and enlarged shaft end portion 113. Housing 84 is provided with a cutout 114 through which gear 108 projects for mating engagement with a rack 116 fixedly secured to a reciprocating machine element shown partially at 118. The element 118 may be connected to the platen 27 shown in FIG. 1. A drive chain 117 shown in FIGS. 2 and 6 is entrained over the sprockets 110 and 98 so that as element 118 and attached rack 116 shift back and forth, gear 108 is rotated by its engagement with the rack, in turn rotating sprocket 110 and, through chain 117, sprocket 98. Gear 96 rotates with gear 98, and is in mesh with a second rack 119 which is fixed to the top surface of table 78 (see FIGS. 2, 3 and 5). Therefore, as the machine element 118 reciprocates, a corresponding reciprocating movement is transmitted to table 78 through the system above described and shown in detail in FIGS. 5 and 6.

As will be understood by those ski'led in the art, the distance traversed by table 78 for a given travel of the machine element 118 and/or platen 27 is determined by the sizes of sprockets 98 and 110, gears 96 and 108, and the relationships therebetween. Therefore by varying the ratio between the diameters of sprockets 98 and 110, for example, the ratio between machine travel and travel of the table 78 may be varied. A single control unit 24 having a given maximum table travel may thus be adapted for use with various machines having different stroke lengths. In addition, this adjustability feature permits a comparatively small unit such as 24 to be utilized to control a machine having a relatively long travel.

Referring now particularly to FIGS. 2, 3 and 4, each control unit includes a plurality of identical switch modules 120, 122, 124 and 126 which are supported in cabinet 29 juxtaposed on the path of table 78. At one end the switch modules are supported on mounting bracket 128 which is bolted as at 130 to chassis end flange 66 (FIG. 3). Adjacent the opposite end of the chassis 62, there is provided an inverted U-shaped bridge 132 having depending legs 134 and 136 (FIGS. 2 and 4) which overlie side chassis flanges 68 and 70 and are secured thereto as by bolts or the like 138. Bridge 132 spans table 78 and supports a box-like enclosure 140 having integral bottom 142 and end walls 144 and 146, and a separate top 148 which may be secured to inwardly projecting flanges 150 of the end walls by screws 152 (FIG. 3). Enclosure 140 may be open at opposite sides as shown. An L-shaped support bracket 154 secured to wall 146 as by bolts 156 (FIG. 3) serves to support the opposite end of the switch modules 120, 122, 124 and 126, so that they are positioned in spaced relation above table 78.

As shown most clearly in FIGS. 7, 8 and 9, each of the switch modules such as 120 comprises a pair of L-shaped members 160 and 162 positioned in allochiral relation with the inner ends of their bases 164 and 166 in closely spaced parallel relation (FIG. 9). The membes 160 and 162 are held in position and secured together by blocks 168 and 170 disposed between the legs of the members at opposite ends thereof, and fastened thereto by screws or the like 172 (FIG. 8) to form a unitary switch support. The inner surface of the leg of each member 160, 162 has a shallow cutout or slot 174 running its entire length and spaced slightly above the respective base 164 or 166. Disposed for slidable movement longitudinally between members 160 and 162 is a switch carriage 176 having a pair of oppositely projecting rails 178 which are positioned within the slots 174 to guide the carriage along the support.

A switch 180 of generally standard construction is mounted on the carriage 176, and includes a projecting actuating button 182 and a flexible arm 184 having a roller 186 at its outer end, whereby upon depression of the roller 186 the switch is actuated by the arm 184 depressing the button 182 in conventional fashion. On the side of the carriage 176 opposite the switch 180, there is a flange 188 which projects between the bases 164 and 166 of the support, and engaged upon the flange is a pointer 190. A graduated scale 192 is adhesively or otherwise secured to the outer face of one of the bases 164 and 166, and thus the position of the carriage and switch along the support may be directly read by noting the position of the pointer 190 which overlies the scale 192.

Mechanism for manually positioning the switch 180 along the module 120 is shown in FIGS. 7 and 8, and comprises a flexible member such as a stout cord or the like 194 secured to a projection 196 on one end of the carriage 176. The cord extends around a pulley 198 on block 168, thence to the opposite end of the module where it is entrained around a shaft 200 journalled for rotation in block 170, and terminating at the other end of the carriage at a post 202 projecting from an integral carriage block 204. Pulley 198 rotates on axle 206 which depends from a plate 208 swingably supported spaced from block 168 on a post 210. Spring 212 connected between plate 208 and a pin 214 urges the plate and pulley in a counterclockwise direction as viewed in FIG. 7, thereby keeping tension on cord 194. Shaft 200 extends outwardly beyond the module 120 and has fixed to its projecting end means for manual rotation, such as the knurled knob shown at 216.

Post 202 has a laterally projecting pin 218 at one end which interfits in a complementary slot in block 204, and is biased to a position retaining the pin in the slot by a spring 220. As the cord 194 is fixed to post 202, the post may be depressed against the spring 220 to unseat the pin 218, and the post then rotated as by a screwdriver or the like to wind the cord thereon to obtain the desired tautness in the cord 194. With the cord wound about post 200 a couple of times and tightened so that it is fairly taut, spring 212 will maintain the desired tension. Rotation of shaft 200 by manipulation of knob 216 shifts the carriage 176 and switch 180 along the module 120 to any desired position. However, there is sufficient frictional resistance between the parts so that the switch 180 will remain in any preselected position even though its roller 186 is subject to repeated contact with moving table 78 as described more fully herebelow.

In FIGS. 3, 7 and 8, the carriage 176 and switch 180 are shown positioned at one extremity of their travel along module 120. Referring particularly to FIG. 3, a relatively rigid hollow tube 222 is shown fixed at one end to the left-hand face of carriage 176 through which the electrical conductors 224 are led. The tube is provided to support the conductors when the switch is shifted to the right as shown in these Figs., and is itself supported in an apertured block 226 (FIG. 8). When the switch is shifted to its extreme opposite position (to the right) the tube still projects into block 226, thereby preventing dropping or entanglement of the conductors 224 in the mechanism. In the position shown in FIG. 3, the tube terminates spaced from wall 144 to accommodate a gentle curve of the conductors so they extend back along bottom wall 142 to a wire loom 228 in which they are retained. From the wire loom 228, the conductors 224 are led through suitable apertures in cover 148 and are connected to terminal blocks 230 and 232 secured to the cover.

Also mounted in the cover 148 is a pilot or indicating light 234 for each switch module, the light being connected in series with a respective switch 180 to give visual indication to the operator whenever the switch is actuated. The terminal blocks 230 and 232 are preferably protected by a separate cover 236 secured to the upper surface of cover plate 148 as by screws (not shown) extending through the opposite flanges 238 and 240 of the cover 236. The conductors 224 are led out of the cabinet 29 through a suitable fitting 242 (FIG. 2). As shown in FIGS. 2 and 3, a tag or label 244 is secured to cover 236 opposite each switch module 120, 122, 124 and 126, upon which there may be printed the identification of the particular machine function controlled by that switch.

As can be seen from an examination of FIGS. 1 and 2, the cabinet 29 may be made in virtually any size to accommodate the number of switch modules such as 120 required for the particular machine the functions of which are to be controlled. FIG. 1 shows a device having 12 modules, while in FIG. 2 there are only four shown. In addition, the length of the modules 120 may be increased or decreased to provide various switch travels to accommodate machines of different stroke length. As previously stated, the ratio of machine element travel to switch travel may be varied within a wide range by changing the relative sizes of the sprockets 98 and 110 and/or the gears 96 and 108. Therefore the same basic device may be utilized to control virtually any machine having a movable element which shifts in a repetitive movement during each cycle of machine operation.

The switch modules are assembled in place by a pair of screws or the like 246 and 248 which extend through the blocks 168 and 170 at opposite ends of the module (FIG. 8) and through the brackets 128 and 154 (FIG. 3) supporting the modules. Access to the screws 246 and 248 is provided by opposed cutouts 250 (See FIG. 2) in the module bases. A position indicator rod 252 extends across the forward edge of table 78 as shown in FIGS. 2 and 3, and lies spaced above the switch modules 120, 122, 124 and 126. The rod 252 is supported at opposite ends in L-brackets 254 which are in turn supported on the table by brackets 256. Each bracket 254 is fastened to its support 256 by screws or bolts 258 which extend through a slot 260 in its base so that the rod 252 may be adjusted with respect to the table 78. In FIG. 3 it can be seen that rod 252 lies spaced rearwardly from ramp 266 on table 78. By positioning the arrow 190 correspondingly with respect to switch roller 186, the rod 252 will lie directly over arrow 190 at the exact instant of switch actuation. The indicator 190 is limitedly adjustable on flange 188 to provide exact calibration for each switch.

Once the device is completely assembled, it is mounted on the machine 20 to be controlled by fastening the cabinet 29 in a convenient fashion to a stationary machine member 22. The connection with the moving machine element 27 may be made by fixing a rack 116 to a portion 118 of the element 27, as shown in FIG. 6, in such fashion that reciprocal movement of the machine element drives pinion 108 through rack 116. Alternately, the gear 108 may be replaced by a reel upon which is wound a flexible tape such as is shown at 262 in FIG. 1, the free end of the tape being fixed to the movable machine element 27 by means of a clamp or the like 264. In the event the tape 262 is used, the spring 104 (FIG. 5) serves as a take-up spring biasing the tape to its retracted or wound-up condition on the reel which replaces gear 108. If the rack and pinion is used, the spring 104 is utilized in a similar fashion to eliminate backlash in the gears, sprockets and drive chain illustrated in FIGS. 3, 5 and 6.

Once the tape or rack and pinion connection is made, the movement of the machine element 27 rotates member 108 (FIG. 6), in turn driving pinion gear 96 through sprockets 98 and 110 and drive chain 117 (FIG. 6). As pinion 96 is in mesh with rack 119 on table 78 (FIGS. 3 and 5), its rotation shifts the table along shafts 72 and 74 (FIG. 3). The leading edge of table 78 has an inclined ramp portion 266 adjacent its end 268 which abuts the switch roller 186, and as the roller rides up the ramp, the button 182 is depressed by arm 184 to actuate the switch. Each switch in the various modules is actuated in similar fashion as the table reciprocates along shafts 72 and 74, and as the table 78 traverses an exact cycle of reciprocation with each operating cycle of the machine being controlled, the time during the machine cycle at which its various functions are actuated is dependent upon the position of the switches 180 along their respective modules 120, 122, 124 and 126, which may be conveniently varied to accomplish any desired sequence and timing of the machine.

In FIG. 10 there is shown an alternate construction which may be used in place of table 78 and shafts 72 and 74. A switch module 120 with a switch 180 identical to that above described is shown, in this case mounted for actuation by an articulated table 270 comprising a series of closely spaced parallel slats 272, 274, 276, etc. mounted on an endless flexible member 278 entrained over a pair of rotatable drive members 280 and 282. One of the members 280 or 282 is connected to shaft 88 (FIGS. 3 and 5) in place of pinion 96 and rack 122. The slats 272, etc. travel back and forth as indicated by the double ended arrow in FIG. 10 to actuate the switches in the same fashion as table 78 in the preceding description. Utilization of table 270 saves space, as it does not extend as far to the left beyond the module 120 as does table 78. This can be discerned by a comparison of FIGS. 3 and 10.

Assume that it is desired to control the operation of an injection molding machine, wherein the cycle of the clamp ram is as follows: rapid forward, slow forward, slow return, rapid return. This is an oversimplification, but will serve for purposes of description. Referring to FIG. 3, these four ram movements may be initiated by the switches of the four modules 120, 122, 124 and 126, as indicated by the labels 244 opposite each module. The time during the cycle at which each switch is actuated to initiate a respective machine function may be preset by manually rotating knobs 216 to position the switches at the proper locations along the modules as indicated by the pointers 190 and scales 192. Accurate positioning is provided by the scales, which may be calibrated to directly read machine position. The machine may then be started and run through a few cycles to check its opration, and if any adjustments are necessary to accomplish exact timing, they may be easily and conveniently made by rotating the appropriate knobs 216 to reposition the switches, which may be done while the machine is running without any danger to the operator, as all moving parts are shielded, and there is no possibility that the operator can get his hands or parts of his clothing entangled in them.

There are frequent occasions wherein it is necessary to maintain an exact relationship between two or more of the switches used for machine control, while at the same time providing for their adjustment as a unit with respect to the remaining switches. A simple structure for doing this shown in FIG. 11, where are shown switch modules 120' and 122', the switches of which are to be kept in an exact spaced relation, as indicated by the pointers 190' and 190". Three identical gears are provided, as shown at 290, 292 and 294, with two of them being secured to the shafts under adjusting knobs 216' and 216" respectively, while the third is mounted for rotation on one of the module members so as to be in mesh with the other two. As can be seen, rotation of either knob 216' or 216" will accomplish identical rotative movement of the other knob, thereby adjusting the two switches the exact same distance along the modules.

Shown in FIG. 12 is a partial top elevation of the table 78 having the inclined ramp portion 266 which contacts the switch rollers to actuate the switches upon movement of the table. Normally, as can be seen from FIG. 3, each switch 180 is actuated as its roller 186 is engaged and lifted, and remains actuated until the roller is released upon return movement of the table. However, there are certain applications wherein it is desired to actuate a given switch one or more times during each machine cycle, but only for a relatively short duration. This momentary and/or repetitive switch actuation may be accomplished by the utilization of structure such as shown in FIG. 12, wherein a pair of centerlines 300 and 302 are shown to schematically represent the longitudinal axis of a pair of switch modules, for example the two adjacent modules 120 and 122 in FIG. 2. Mounted atop the upper surface of table 78 are a plurality of blocks 304, 306 and 308, each block having tapered opposite end portions 310 and 312 as shown.

Referring to FIG. 3, the appropriate switch modules such as 120 shown therein, are raised above their illustrated position where they will not be actuated by ramp 266 on the leading edge 268 of the table. Turning back to FIG. 12, the switches will clear ramp 266 as the table passes the switch rollers, but the blocks 304, 306 will contact the switch roller of the switch on line 300, actuating the switch twice for a short duration during each cycle, while block 308 will actuate the switch on line 302 once momentarily. The blocks may be made in different lengths to actuate the switches for any desired period during the cycle, and any number of blocks may be used for repeated switch actuation during a single cycle. Furthermore, with two switches wired in series actuation of both switches is required to initiate machine function, and time and duration may be controlled even further by this expedient.

What is claimed is:

1. Mechanism for controlling the operation of a machine or the like having a cyclically movable element, comprising, in combination: a generally rectangular enclosure having a rear wall with means for securement to said machine, upstanding side walls and a front wall hingedly connected to one of said side walls for swingable movement to expose the interior of the enclosure; support means mounted on said rear wall; a plurality of elongate switch modules removably mounted on said support means in closely spaced parallel relation, each module including a support generally U-shaped in cross section with the bight of the U-shape facing said front wall and an electric switch means supported between the legs of the U-shape for selective positioning therealong and having a switch actuating arm projecting beyond the free ends of the legs; a reciprocable part mounted on said support means rearwardly of said modules for movement in a path parallel to the longitudinal axes of said modules and having a switch actuating portion adapted to engage said switch arms to actuate each switch means during reciprocation of the part; means operatively connected to said part and to said movable machine element for translating cyclical element movement into corresponding linear reciprocal part movement; and means connected to each of said switch means for selectively positioning each switch means along its respective support and having a manually manipulatable portion projecting forwardly of said module.

2. Mechanism as defined in claim 1 characterized in that said means for translating element movement into linear reciprocal part movement comprises a first rotatable member connected to said machine element for rotation in response to element movement, a second rotatable member engaging said part to impart linear movement thereto upon rotation of said second member, and drive means interposed between said first and second rotatable members for transmitting movement therebetween.

3. Mechanism as defined in claim 1 characterized in that said reciprocable part comprises a flat table member having a leading edge defining said switch actuating portion extending perpendicular to the longitudinal switch module axes substantially completely across all of said modules.

4. Mechanism as defined in claim 3 characterized in that said table member defines at least one switch actuating block mounted on the table and projecting above the flat surface thereof in axial alignment with at least one of said switch modules, with said one switch module being mounted with its switch arm spaced above the table out of the path of said leading edge for actuation by said block.

5. Mechanism as defined in claim 1 characterized in that each of said switch modules is a unitary structure including an elongate support, switch means and switch positioning means independently disconnectably mounted on said support.

6. Mechanism as defined in claim 1 characterized in that each switch means includes electrical conductor means extending therefrom for connection to said machine, and an indicator light is mounted in said enclosure electrically connected in series with each said switch means.

7. Mechanism as defined in claim 3 characterized in that each switch means includes position indicator means indicating the position of the switch means along its respective module, and said table member includes visual position indicator means bridging all of said switch modules parallel to said table leading edge for indicating the position of said edge along said modules.

8. Mechanism as defined in claim 1 characterized in that at least two of said means for positioning each switch means along its support are interconnected for conjoint movement to thereby position two switch means equal distances along their supports upon manipulation of one of said two positioning means.

9. In mechanism for controlling machine operation including a plurality of switch means, a switch module comprising: an elongate support having a pair of side walls defining spaced apart parallel guideways, a switch carriage having a pair of projections in cooperating engagement with said guideways for movement of said carriage along the support, switch means on said carriage positioned for actuation by means external of the module, means connected to the carriage for shifting the carriage and switch means in opposite directions along said support and including means for retaining the carriage in any preselected position therealong, and conductor means connected to said switch means and extending therefrom for connection to said machine.

10. A switch module as defined in claim 9 characterized in that said support comprises a pair of elongate, allochiral, L-shaped portions positioned in spaced, parallel relation with co-planar bases projecting toward each other, said switch carriage disposed between the legs of said L-shaped portions for guided movement therebetween, and said switch means mounted on said carriage intermediate the free ends of said legs for actuation by means external of the module.

11. A switch module as defined in claim 9 characterized in that said conductor means includes a plurality of flexible electrical conductors and a protective, relatively rigid tubular member enclosing said conductors, said tubular member connected to said carriage at one end and being of sufficient length to protect the conductors throughout the length of said support in all positions of said carriage therealong.

12. A switch module as defined in claim 10 characterized in that said support is provided with a scale on an exposed face thereof and an indicator is fixed on said carriage having a portion overlying said scale for indicating the position of said switch means along the support.

13. A switch module as defined in claim 12 characterized in that said scale is positioned on an outwardly facing surface of one of said legs of said L-shaped portions, and said indicator projects between the leg free ends and defines a pointer overlying said scale.

14. A switch module as defined in claim 9 characterized in that said switch means comprises a mechanically actuated switch having an external actuating arm projecting beyond said support side walls for switch actuating engagement by means external of the module.

15. A switch module as defined in claim 9 characterized in that said means for shifting the carriage comprises a flexible elongate cord connected at opposite ends to said carriage, a shaft journalled for rotation in said support, and manually manipulatable means on the shaft for rotating the same, said cord being wound about the shaft intermediate said ends.

* * * * *